United States Patent
Nishizawa et al.

(10) Patent No.: US 9,719,440 B2
(45) Date of Patent: Aug. 1, 2017

(54) DPF REGENERATION CONTROL DEVICE

(71) Applicant: Mitsubishi Heavy Industries, Ltd., Tokyo (JP)

(72) Inventors: Kazuki Nishizawa, Tokyo (JP); Tomohide Yamada, Tokyo (JP); Daisuke Sato, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/025,530

(22) PCT Filed: Sep. 8, 2014

(86) PCT No.: PCT/JP2014/073622
§ 371 (c)(1),
(2) Date: Mar. 28, 2016

(87) PCT Pub. No.: WO2015/045825
PCT Pub. Date: Apr. 2, 2015

(65) Prior Publication Data
US 2016/0222900 A1    Aug. 4, 2016

(30) Foreign Application Priority Data

Sep. 27, 2013   (JP) ................................ 2013-202078

(51) Int. Cl.
*F01N 3/00*    (2006.01)
*F01N 3/02*    (2006.01)
(Continued)

(52) U.S. Cl.
CPC ........... *F02D 41/029* (2013.01); *F01N 3/023* (2013.01); *F01N 3/0253* (2013.01); *F01N 9/002* (2013.01);
(Continued)

(58) Field of Classification Search
CPC ........ F01N 3/023; F01N 3/0253; F01N 9/002; F01N 2560/06; F01N 2560/14;
(Continued)

(56) References Cited

U.S. PATENT DOCUMENTS

| 2008/0264037 A1* | 10/2008 | Takahashi ............. F01N 11/002 60/277 |
| 2009/0235644 A1* | 9/2009 | Wu ..................... B01D 53/9495 60/285 |
| 2013/0167507 A1* | 7/2013 | Barucchi ................. F01N 9/002 60/274 |

FOREIGN PATENT DOCUMENTS

| EP | 1905992 A1 | 4/2008 |
| EP | 2607672 A1 | 6/2008 |

(Continued)

OTHER PUBLICATIONS

Machine Translation JP 2005-120986 Done Oct. 3, 2016.*
(Continued)

*Primary Examiner* — Mark Laurenzi
*Assistant Examiner* — Dapinder Singh
(74) *Attorney, Agent, or Firm* — Berkeley Law & Technology Group, LLP

(57) ABSTRACT

An object is to provide a DPF regeneration control device whereby it is possible to prevent clogging of a DOC more efficiently than conventional techniques, and to recover the DOC securely from a clogging condition even if the DOC is actually clogged. A DPF regeneration control device (10) includes: a DPF temperature-increase unit (10A) including a first temperature-increase unit (12) configured to heat a DPF (37) to a predetermined temperature, and a second temperature-increase unit (14) configured to heat the DPF to a temperature higher than the predetermined temperature in cooperation with the first temperature-increase unit; a DOC clogging detection unit (10D) configured to detect that a (Continued)

DOC (35) is clogged if a clogging parameter detected during execution of the automatic regeneration exceeds a clogging threshold value determined in advance for a predetermined period, the clogging parameter being related to clogging of the DOC, and a DOC clogging countermeasure unit (10C) configured to stop the automatic regeneration and issue an alert to prompt execution of the manual regeneration, if the clogging of the DOC is detected.

19 Claims, 6 Drawing Sheets

(51) Int. Cl.
| | | |
|---|---|---|
| *F01N 3/10* | (2006.01) | |
| *F01N 3/20* | (2006.01) | |
| *F02D 41/02* | (2006.01) | |
| *F01N 3/023* | (2006.01) | |
| *F02D 41/40* | (2006.01) | |
| *F01N 9/00* | (2006.01) | |
| *F01N 3/025* | (2006.01) | |

(52) U.S. Cl.
CPC ......... *F02D 41/024* (2013.01); *F02D 41/405* (2013.01); *F01N 2560/06* (2013.01); *F01N 2560/14* (2013.01); *F01N 2900/1602* (2013.01); *F01N 2900/1606* (2013.01); *Y02T 10/26* (2013.01); *Y02T 10/44* (2013.01); *Y02T 10/47* (2013.01)

(58) Field of Classification Search
CPC ..... F01N 2900/1602; F01N 2900/1606; F02D 41/024; F02D 41/029; F02D 41/405; Y02T 10/26; Y02T 10/44; Y02T 10/47

USPC .......... 60/277, 286, 295, 297, 299, 300, 311
See application file for complete search history.

(56) References Cited

FOREIGN PATENT DOCUMENTS

| | | |
|---|---|---|
| EP | 1980738 A1 | 10/2008 |
| JP | 2005120986 A | 5/2005 |
| JP | 200723883 A | 2/2007 |
| JP | 2008069648 A | 3/2008 |
| JP | 2008128170 A | 6/2008 |
| JP | 2008274835 A | 11/2008 |
| JP | 2010031833 A | 2/2010 |
| JP | 2010071203 A | 4/2010 |
| JP | 2010101200 A | 5/2010 |
| JP | 2011069323 A | 4/2011 |
| JP | 2012127297 A | 7/2012 |
| JP | 2013068184 A | 4/2013 |
| JP | 2013113282 A | 6/2013 |
| JP | 2013124631 A | 6/2013 |
| JP | 2013130191 A | 7/2013 |

OTHER PUBLICATIONS

Notification Concerning Transmittal of International Preliminary Report on Patentability, App No. PCT/JP2014/073622, Filed Sep. 8, 2014, 19 Pages.
International Search Report, App. No. PCT/JP2014/073622, Filed Sep. 8, 2014, 13 Pages.
Decision to Grant a Patent, App. No. JP2013-202078, Drafting Date Feb. 9, 2016, 6 Pages.
Extended European Search Report, App. No. 14847472.9, Mailed Mar. 24, 2017, 7 Pages.

* cited by examiner

DPF REGENERATION CONTROL DEVICE

TECHNICAL FIELD

The present disclosure relates to a DPF regeneration control device used for an exhaust gas processing device of a diesel engine, the exhaust gas processing device including a diesel oxidation catalyst (DOC) disposed in an exhaust channel and a diesel particulate filter (DPF) disposed on the downstream side of the DOC.

BACKGROUND ART

A diesel engine is equipped with an exhaust gas processing device including a diesel oxidation catalyst (DOC) disposed in an exhaust channel and a diesel particulate filter (DPF) disposed on the downstream side of the DOC. A diesel particulate filter (DPF) is a device for collecting particulate matters (PM) contained in exhaust gas discharged from the diesel engine. A DPF is normally formed of ceramic or the like in a honeycomb-shaped monolith with adjacent vents closed alternately on an inlet side and an outlet side so that exhaust gas passes through filtering walls, which remove PM. A DPF may support a catalyst. Accumulation of PM in a DPF eventually brings about clogging, which leads to not only a decrease in the PM-collecting performance of the DPF but also to an increase in an exhaust pressure and thus has a negative effect on fuel efficiency. Thus, it is necessary to perform forced regeneration to remove PM accumulated on the DPF every time when a PM-accumulation amount reaches a predetermined amount or when an engine operation time reaches a predetermined period.

Forced regeneration of a DPF is performed by forcedly increasing the inlet temperature of the DPF. In general, the inlet temperature of a DPF is forcedly increased by supplying non-combusted fuel to an exhaust-gas processing device by post injection, which is to inject fuel after a main-combustion injection timing, and oxidizing the non-combusted fuel with a diesel oxidization catalyst (DOC) so that the temperature of the non-combusted fuel increases. Further, combustion may be supplied by exhaust-duct injection to an exhaust channel on the downstream side of the engine. A DOC is normally formed of ceramic or the like in a honeycomb-shaped monolith, similarly to the above described DPF, and supports an oxidization catalyst on the inner surface of the DOC.

In such an exhaust-gas post treatment device, if a state with a low operation load and a low exhaust-gas temperature continues, SOF or soot of non-combusted fuel or the like adheres to an upstream end surface of the DOC, and clogging of the DOC gradually progresses. If the DOC gets clogged, the exhaust pressure increases and the fuel efficiency decreases, and the non-combusted fuel is not sufficiently oxidized by the DOC in the forced regeneration and slips. In response, more and more non-combusted fuel is supplied to the DOC to increase the inlet temperature of the DPF to a predetermined temperature, thereby deteriorating fuel efficiency. Further, the slipped fuel is oxidized and heated by the DPF supporting a catalyst, and thus promotes abnormal combustion of the PM, thereby raising a risk of heat damage to the DPF. Further, if the temperature is increased by late post injection, the post injection amount increases and a risk of oil dilution increases in accordance.

To prevent such clogging of the DOC, Patent Document 1 discloses a technique, with an exhaust-gas purification device for a diesel engine, to calculate an adhering amount of non-combusted fuel adhering to the surface of the DOC, reduce the opening degree of an intake throttle if the calculated adhering amount of the non-combusted fuel is greater than a predetermined value to increase the exhaust-gas temperature by decreasing the air excess ratio, and promote oxidization removal of HC adhering to the surface of the DOC.

Further, Patent Document 2 discloses a technique to combust and remove non-combusted fuel adhering to a surface of a DOC by maintaining an exhaust-gas temperature at a predetermined temperature with an exhaust-gas temperature maintaining unit after completion of a regeneration process of a DPF in a diesel engine.

CITATION LIST

Patent Literature

Patent Document 1: JP2011-69323A
Patent Document 2: 2012-127297A

SUMMARY

Problems to be Solved

However, the above described Patent Document 1 does not disclose a relationship between the process of removing non-combusted fuel adhering to a surface of a DOC and normal forced regeneration of a DPF. In the first place, non-combusted fuel that adheres to a surface of a DOC mostly comes from post injection or exhaust-duct injection in forced regeneration of a DPF. Thus, to remove non-combusted fuel adhering to a surface of a DOC efficiently, it is necessary to control removal of the non-combusted fuel adhering to the surface of the DOC and forced regeneration of a DPF in a unified manner.

Further, the technique disclosed in the above described Patent Document 2 is to maintain the exhaust gas temperature at a predetermined temperature always after completion of forced regeneration regardless of the clogging condition of a DOC, to remove non-combusted fuel adhering to the DOC. With this technique, the exhaust-gas temperature is maintained at a predetermined temperature even if there is substantially no risk of clogging of the DOC, and thus energy may be unnecessarily consumed. Further, Patent Document 2 does not mention any measure to be taken after clogging of the DOC has actually taken place.

At least one embodiment of the present invention was made in view of the above conventional problem, and an object of the at least one embodiment of the present invention is to provide a DPF regeneration control device whereby it is possible to prevent clogging of a DOC more efficiently than conventional techniques, and to recover the DOC securely from a clogging condition even if the DOC is actually clogged.

Solution to the Problems

According to at least one embodiment of the present invention, a DPF regeneration control device, provided for an exhaust-gas processing device of a diesel engine, the exhaust-gas processing device including a DOC disposed in an exhaust channel and a DPF disposed on a downstream side of the DOC, for controlling execution of forced regeneration of heating the DPF to remove PM which accumulates on the DPF, the forced regeneration comprising automatic regeneration automatically executed if a predetermined forced-regeneration execution condition is satisfied, and manual regeneration executed by manual operation to heat the DPF to a higher temperature than in the automatic regeneration, comprises: a DPF temperature-increase unit including a first temperature-increase unit configured to heat the DPF to a predetermined temperature, and a second temperature-increase unit configured to heat the DPF to a temperature higher than the predetermined temperature in cooperation with the first temperature-increase unit; a DOC clogging detection unit configured to detect that the DOC is clogged if a clogging parameter detected during execution of the automatic regeneration exceeds a clogging threshold value determined in advance for a predetermined period, the clogging parameter being related to clogging of the DOC; and a DOC clogging countermeasure unit configured to stop the automatic regeneration and issue an alert to prompt execution of the manual regeneration, if the clogging of the DOC is detected.

The above DPF regeneration control device includes the DOC clogging detection unit for detecting clogging of the DOC during the automatic regeneration. If clogging of the DOC is detected during the automatic regeneration, the automatic regeneration is stopped and an operator or the like of the diesel engine is prompted by an alert to execute the manual regeneration, which is to increase the temperature of the DPF higher than that in the automatic regeneration. Thus, it is possible to recover the DOC from clogging securely even if the DOC is clogged.

In some embodiments, the DPF regeneration control device further comprises: a DOC clogging initial stage detection unit configured to detect that the DOC is in an initial stage of the clogging if the clogging parameter detected during execution of the automatic regeneration is not greater than the clogging threshold value and greater than a second clogging threshold value smaller than the clogging threshold value for a predetermined period, or if the clogging parameter is not greater than the clogging threshold value and a change amount of the clogging parameter is greater than a change-amount threshold value set in advance for a predetermined period; and a DOC clogging initial stage countermeasure unit configured to operate the first temperature-increase unit for a predetermined period after completion of the automatic regeneration if the DOC is detected to be in the initial stage of the clogging.

The above DPF regeneration control device includes the DOC clogging initial stage detection unit for detecting the clogging initial stage of the DOC during the automatic regeneration. Then, if the clogging initial stage of the DOC is detected during the automatic regeneration, the first temperature-increase unit is executed for a predetermined period after completion of the automatic regeneration.

With the above DPF regeneration control device, the temperature of the DOC is increased by the first temperature-increase unit only if the clogging initial stage of the DOC is detected. If the clogging initial stage of the DOC is not detected, the temperature of the DOC is not increased by the first temperature-increase unit. In this way, it is possible to prevent clogging of the DOC more efficiently than conventional techniques.

In some embodiments, the DPF regeneration control device further comprises: a DOC clogging dangerous state detection unit configured to detect that the DOC is in a clogging dangerous state if the diesel engine is under an operation state in which clogging of the DOC is likely to occur during normal operation in which none of the forced regenerations, which are the automatic regeneration and the manual regeneration, is executed; and a DOC clogging dangerous state countermeasure unit configured to operate the first temperature-increase unit for only a predetermined period if the DOC is detected to be in the clogging dangerous state.

In the above embodiment, the DOC clogging dangerous state detection unit detects that the DOC is in the clogging dangerous state if one or more of the following conditions are satisfied: the temperature of the exhaust gas is continuously not greater than a predetermined temperature for a predetermined period or longer; the number of times per unit time that the change rate of the engine rotation speed of the diesel engine exceeds a preset rotation-speed threshold value continuously exceeds a threshold value for a predetermined period or longer; or a mean value of a PM discharge-amount estimate value is continuously at least a preset threshold value for a predetermined period or longer.

Herein, the change rate of the engine rotation speed is given by an expression of (rotation speed after change—rotation speed before change)/$\Delta t$. Further, the ECU estimates a PM discharge amount successively from the engine rotation speed, the fuel injection amount, and the air flow rate, for instance, and a mean value per unit time of the estimate value of the PM discharge amount can be used.

According to the above embodiment, the clogging dangerous state of the DOC is detected from the operation state of the engine, and if it is detected that the DOC is in the clogging dangerous state, the first temperature-increase unit increases the temperature of the DOC. Thus, it is possible to prevent clogging of the DOC in advance during normal operation.

In some embodiments, the first temperature-increase unit comprises at least one of: a throttle valve control unit configured to control an opening degree of a throttle valve disposed in an intake channel; an early post injection control unit configured to control a fuel injection amount of early post injection of injecting fuel after a time of main combustion injection, or a rail-pressure control unit configured to control a rail pressure at which the fuel is injected, and the second temperature-increase unit comprises: a late post injection control unit configured to control a fuel injection amount of late post injection of injecting fuel at a timing which does not contribute to combustion in a combustion chamber after the early post injection, or an exhaust-duct injection control unit configured to control a fuel injection amount of exhaust-duct injection of injecting fuel to an exhaust channel on an engine downstream side.

In some embodiments, the clogging parameter is set on the basis of a temperature difference between an inlet temperature of the DPF and an outlet temperature of the DPF.

If clogging of the DOC progresses, fuel is not sufficiently oxidized by the DOC during forced regeneration, and the DPF inlet temperature does not sufficiently increase. Further, the non-combusted fuel having slipped the DOC is combusted by the DPF at the downstream side, and thus the DPF outlet temperature increases excessively. Thus, the clogging parameter Pr1 can be set by the following equation (1), for instance, where Tp1 is the inlet temperature of the DPF and Tp2 is the outlet temperature of the DPF. In this case, the clogging parameter Pr1 increases with progress of clogging of the DOC.

$$Pr1=(Tp2-Tp1) \qquad (1)$$

According to the above embodiment, clogging of the DOC and the clogging initial stage of the DOC can be detected by detecting the inlet temperature and the outlet temperature of the DPF.

In some embodiments, the clogging parameter is set as an outlet temperature of the DPF.

Specifically, if clogging of the DOC progresses, non-combusted fuel having slipped the DOC is combusted by the DPF at the downstream side of the DOC, and thus the DPF outlet temperature increases excessively, as described above. Thus, the clogging parameter Pr2 can be set by the following equation (2), where Tp2 is the outlet temperature of the DPF. In this case, the clogging parameter Pr2 increases with progress of clogging of the DOC.

$$Pr2=Tp2 \qquad (2)$$

According to the above embodiment, clogging of the DOC and the clogging initial stage of the DOC can be detected by detecting the outlet temperature of the DPF.

In some embodiments, the clogging parameter is set on the basis of a temperature difference between an outlet temperature and an inlet temperature of the DOC, a flow rate of exhaust gas flowing through the DOC, and a fuel-injection amount of the late post injection or the exhaust-duct injection.

If clogging of the DOC progresses, fuel injected by a late post injection unit or an exhaust-duct injection unit is not oxidized sufficiently by the DOC, and the calorific value of the DOC with respect to the fuel injection amount decreases. Thus, the clogging parameter Pr3 can be set by the following equation (3), where ΔTo is a temperature difference between the outlet temperature and the inlet temperature of the DOC, Qe is the flow rate of exhaust gas flowing through the DOC, and Qfe is the fuel injection amount of late post injection or exhaust-duct injection. In this case, the clogging parameter Pr3 increases with progress of clogging of the DOC.

$$Pr3=Qfe/\Delta To \cdot Qe \qquad (3)$$

According to the above embodiment, clogging of the DOC and the clogging initial stage of the DOC can be detected by detecting the inlet temperature and the outlet temperature of the DOC and the fuel injection amount of late post injection or exhaust-duct injection.

In some embodiments, the above clogging parameter is set on the basis of an increasing speed of the inlet temperature of the DPF and an increasing speed of the inlet temperature of the DPF in an initial state in which the DOC is not clogged.

If clogging of the DOC progresses, fuel is not sufficiently oxidized by the DOC, and the increase speed of the DPF inlet temperature slows down. Thus, the clogging parameter Pr4 can be set by the following equation (4), where Vt is an increase speed of the inlet temperature of the DPF and Vt' is an increase speed of the inlet temperature of the DPF in an initial state in which the DOC is not clogged. In this case, the clogging parameter Pr4 increases with progress of clogging of the DOC.

$$Pr4=Vt'/Vt \qquad (4)$$

According to the above embodiment, clogging of the DOC and the clogging initial stage of the DOC can be detected by having obtained in advance an increase speed of the DPF inlet temperature in the initial state and detecting the increase speed of the DPF inlet temperature.

The increase speed Vt of the DPF inlet temperature and the increase speed Vt' of the inlet temperature of the DPF in the initial state in the above embodiment are detected under the same conditions which affect the increase speed, such as the fuel injection amount and the injection timing.

In some embodiments, the late post injection control unit or the exhaust-duct injection control unit is configured to control a fuel injection amount so that an inlet temperature of the DPF reaches a target temperature required to execute the forced regeneration. Further, the clogging parameter is set: on the basis of a cumulative fuel-injection amount of the late post injection or the exhaust-duct injection of injecting fuel while an inlet temperature of the DPF increases by a predetermined temperature, and a cumulative fuel-injection amount of the late post injection or the exhaust-duct injection of injecting fuel while the inlet temperature of the DPF increases by the predetermined temperature in an initial state in which the DOC is not clogged; or on the basis of a mean injection amount of the late post injection or the exhaust-duct injection of injecting fuel in a stable state in which the inlet temperature of the DPF has reached a target control temperature, and a mean injection amount of the late post injection or the exhaust-duct injection of injecting fuel in a stable state in which the inlet temperature of the DPF has reached a target control temperature in an initial state in which the DOC is not clogged.

The late post injection control unit or the exhaust-duct injection control unit is configured so as to control the fuel injection amount so that the inlet temperature of the DPF reaches a target temperature required to execute forced regeneration. Thus, if clogging of the DOC progresses and fuel is not sufficiently oxidized by the DOC with an insufficient increase of the DPF inlet temperature, the late post injection control unit or the exhaust-duct injection control unit performs a control to increase the fuel injection amount of the late post injection or exhaust-duct injection. Accordingly, the clogging parameter Pr5 can be set by the following equation (5), for instance, where ΣQfl is a cumulative fuel-injection amount of late post injection or exhaust-duct injection of injecting fuel while the inlet temperature of the DPF increases by a predetermined temperature, and ΣQfl' is a cumulative fuel-injection amount of late post injection or exhaust-duct injection of injecting fuel while the DPF inlet temperature increases by a predetermined temperature in an initial state in which the DOC is not clogged. In this case, the clogging parameter Pr5 increases with progress of clogging of the DOC.

$$Pr5=\Sigma Qfl/\Sigma Qfl' \qquad (5)$$

Alternatively, a clogging parameter Pr5' can be set by, for instance, the following equation (5)', where Qgl is a mean fuel-injection amount of late post injection or exhaust-duct injection of injecting fuel in a stable state in which the inlet temperature of the DPF has reached a target control temperature, and Qgl' is a mean fuel-injection amount of late post injection or exhaust-duct injection of injecting fuel in a state in which the inlet temperature of the DPF has reached a target control temperature in an initial state in which the DOC is not clogged. In this case, the clogging parameter Pr5' increases with progress of clogging of the DOC.

$$Pr5'=Qgl/Qgl' \qquad (5)'$$

According to the above embodiment, clogging of the DOC and the clogging initial stage of the DOC can be detected by having obtained in advance the cumulative fuel-injection amount of late post injection or exhaust-duct injection of injecting fuel while the DPF inlet temperature increases by a predetermined temperature in the initial state, and detecting the cumulative amount of late post injection or exhaust-duct injection of injecting fuel while the DPF inlet temperature increases by a predetermined temperature. Alternatively, it is possible to detect clogging of the DOC and the initial stage of clogging of the DOC by detecting the mean fuel-injection amount of late post injection or exhaust-duct injection of injection in a stable state in which the inlet temperature of the DPF has reached a target control temperature, and the mean injection amount of late post injection or exhaust-duct injection of injection in a state in which the inlet temperature of the DPF has reached a target control temperature in an initial state in which the DOC is not clogged.

Further, in the above embodiment, the above described $\Sigma Qfl$, $\Sigma Qfl'$, $Qgl$, and $Qgl'$ are detected under the same conditions which affect the cumulative amount of late post injection or exhaust-duct injection, such as a fuel-injection timing and an increase speed of the DPF inlet temperature.

Advantageous Effects

According to at least one embodiment of the present invention, it is possible to provide a DPF regeneration control device whereby it is possible to prevent clogging of a DOC more efficiently than conventional techniques, and to recover the DOC securely from clogging even if the DOC is actually clogged.

DETAILED DESCRIPTION

Embodiments of the present invention will now be described in more detail with reference to the accompanying drawings.

However, the scope of the present invention is not limited to the following embodiments. It is intended that dimensions, materials, shapes, relative positions and the like of components described in the embodiments shall be interpreted as illustrative only and not limitative of the scope of the present invention.

Figure 1:
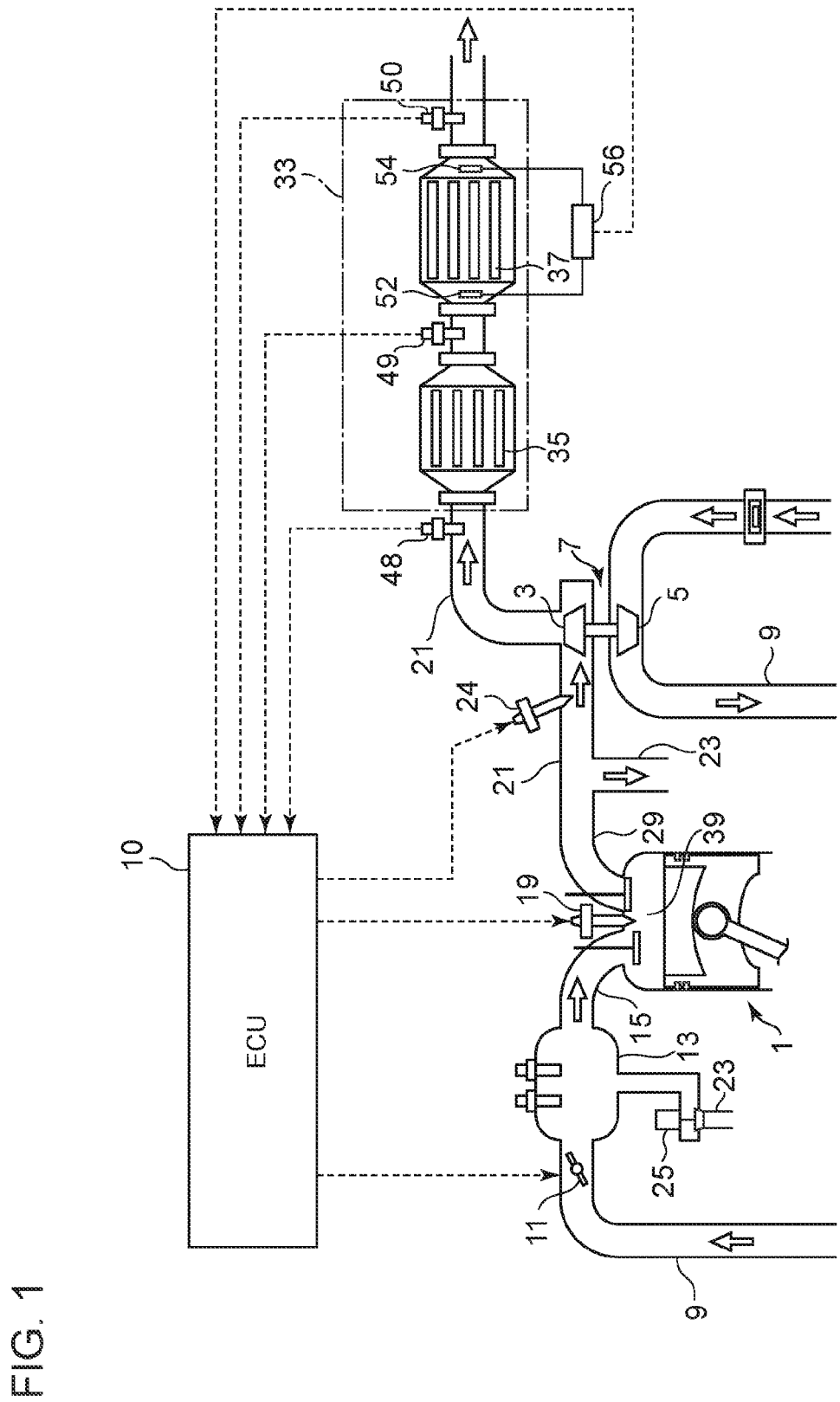
FIG. 1 is an overall configuration diagram of an exhaust-gas processing device for a diesel engine according to an embodiment of the present invention.

FIG. 1 is an overall configuration diagram of an exhaust-gas processing device for a diesel engine according to an embodiment of the present invention.

As illustrated in FIG. 1, an exhaust channel 21 is connected to the downstream side of a diesel engine 1. An exhaust-gas processing device 33 is disposed in the exhaust channel 21, the exhaust-gas processing device 33 including a diesel oxidation catalyst (DOC) 35 and a diesel particulate filter (DPF) 37 disposed on the downstream side of the DOC 35. The DOC 35 has a function to oxidize and remove non-combusted fuel (HC) and carbon monoxide (CO) in exhaust gas and to oxidize nitrogen monoxide (NO) in exhaust gas to produce nitrogen dioxide ($NO_2$). Further, the DOC 35 increases the temperature of passing exhaust gas with oxidation heat of injected fuel to increase the inlet temperature of the DPF 37. The DPF 37 is a device which collects particulate matters (PM), such as soot, contained in exhaust gas with a filter to remove the particulate matters from exhaust gas.

Further, an intake channel 9 is connected to the upstream side of the diesel engine 1 via an intake manifold 13. An exhaust turbocharger 7 is disposed between the intake channel 9 and the exhaust channel 21. The exhaust turbocharger 7 includes an exhaust turbine 3 disposed in the exhaust channel 21 and a compressor 5 disposed in the intake channel 9, and the compressor 5 is configured to be driven coaxially with the exhaust turbine 3. Further, an inter cooler (not depicted) and the throttle valve 11 are disposed in the intake channel 9. The opening degree of the throttle valve 11 is controlled by an ECU 10 described below. Then, the inter cooler cools compressed intake air discharged from the compressor 5, the throttle valve 11 controls the intake flow rate of the compressed intake air, and the compressed intake air flows into the combustion chamber 39 of each cylinder of the diesel engine 1 via an intake port 15.

Further, the diesel engine 1 includes a fuel injection valve 19 for injecting a high-pressure fuel to the combustion chamber 39. The fuel injection valve 19 is connected to a common rail (not depicted) accumulating a high-pressure fuel, and the ECU 10 described below controls the injection timing and the fuel injection amount of the fuel injection valve 19. The high-pressure fuel injected into the combustion chamber 39 is mixed with the above described intake air and combusted in the combustion chamber 39.

Further, the EGR duct 23 branches from the exhaust channel 21 at a position immediately downstream an exhaust port 29 disposed in the exhaust channel 21. The EGR duct 23 is connected to the intake manifold 13 disposed on the downstream side of the throttle valve 11. An EGR valve 25 is disposed in the EGR duct 23, and is controlled so that a part of exhaust gas discharged from the diesel engine 1 flows through the EGR duct 23 to recirculate in the diesel engine 1.

The exhaust gas discharged from the diesel engine 1 drives the above described exhaust turbine 3 to drive the compressor 5 coaxially. Then, after flowing through the exhaust channel 21, the exhaust gas flows into the DOC 35 and the DPF 37 of the above described exhaust-gas processing device 33. The exhaust gas having flowed into the exhaust-gas processing device 33 is discharged outside the engine after oxidative removal of non-combusted fuel (HC) and carbon monoxide (CO) in the exhaust gas by the DOC 35 and removal of particulate matters (PM) in the exhaust gas by the DPF 37.

While a part of PM removed by the DPF 37 is combusted by high-temperature exhaust gas discharged from the engine in operation (natural regeneration), the rest of PM is accumulated on the filter of the DPF. Excessive accumulation of PM may bring about a decrease in the PM collecting performance and a decrease in the engine output, for instance. Thus, for the exhaust-gas processing device 33 including the DPF 37, forced regeneration needs to be performed at an appropriate timing to combust PM accumulating on the filter forcedly to regenerate the filter.

There are at least two types of forced regeneration: automatic regeneration executed automatically by the ECU 10; and manual regeneration executed manually by an operator. The automatic regeneration is automatically executed if predetermined forced-regeneration execution conditions are met, regardless of whether a vehicle is moving or standing. In contrast, the manual regeneration is executed by, for instance, button operation of an operator or the like, basically while a vehicle is standing. Thus, the regeneration temperature is high in the manual regeneration than in the automatic regeneration. For example, the inlet temperature of the DPF 37 is 600 to 610° C. in the automatic regeneration, and is 620 to 630° C. in the manual regeneration.

Various sensors are disposed in the exhaust channel 21, the sensors including a DOC inlet temperature sensor 48, a DPF inlet temperature sensor 49, a DPF outlet temperature sensor 50, a DPF inlet pressure sensor 52, a DPF outlet pressure sensor 54, and a DPF differential-pressure sensor 56. Signals related to the DOC inlet temperature, the DPF inlet temperature, the DPF outlet temperature, the DPF differential pressure measured by the above sensors are inputted to the ECU 10.

The ECU 10 is configured as a microcomputer including a central processing unit (CPU), a random access memory (RAM), a read only memory (ROM), and an I/O interface.

Figure 2:
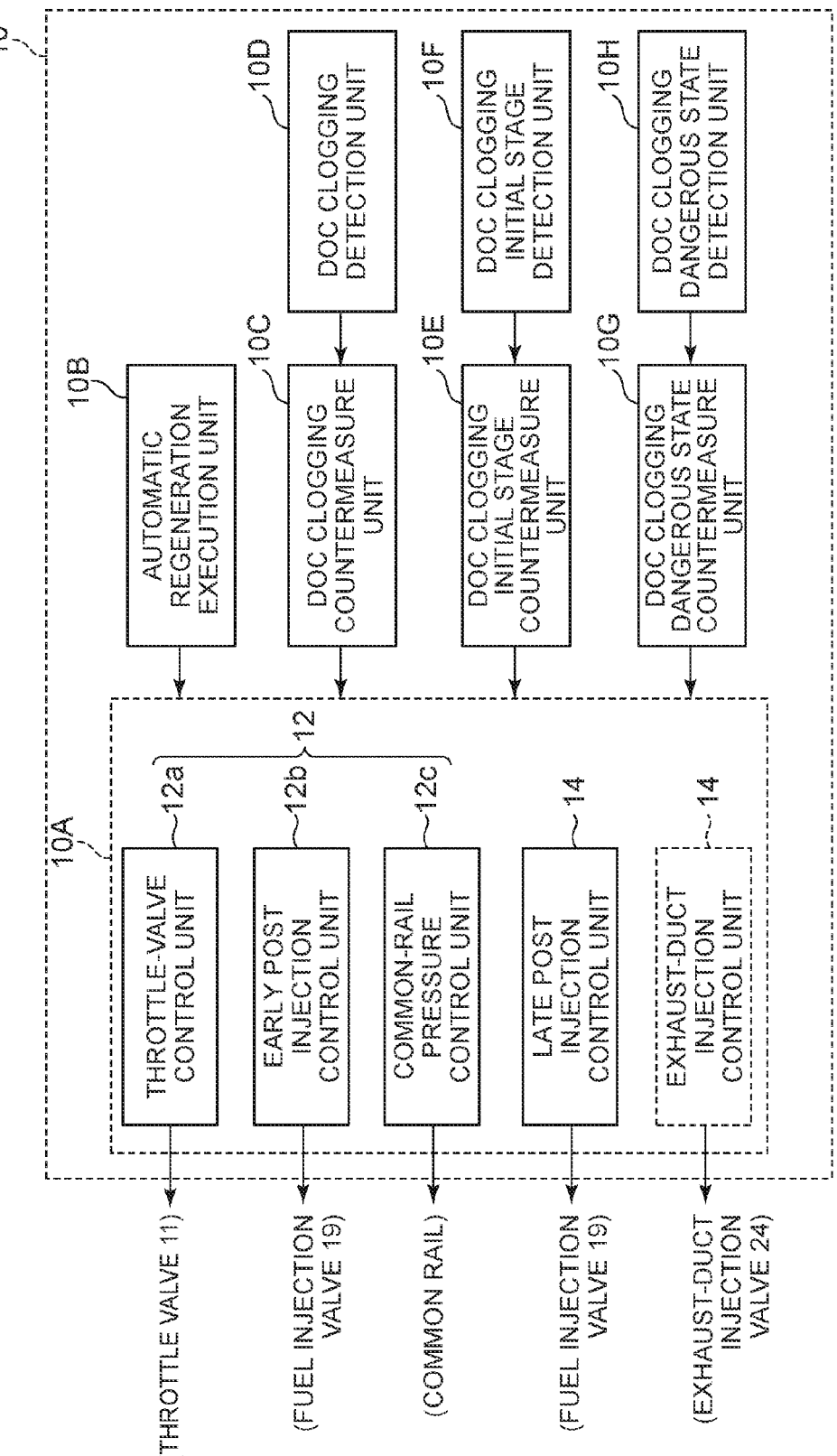
FIG. 2 is a block diagram for describing functions of an ECU.

FIG. 2 is a block diagram for describing functions of an ECU.

As illustrated in FIG. 2, the ECU 10 of the present embodiment is configured as a DPF regeneration control device 10 for controlling a regeneration process of the DPF 37, the DPF regeneration control device 10 at least including a DPF temperature-increase unit 10A, an automatic regeneration execution unit 10B, a DOC clogging countermeasure unit 10C, a DOC clogging detection unit 10D, a DOC clogging initial stage countermeasure unit 10E, and a DOC clogging initial stage detection unit 10F.

The DPF temperature-increase unit 10A includes the first temperature-increase unit 12 which increases the temperature of the DPF 37 to a predetermined temperature, and the second temperature-increase unit 14 which increases the temperature of the DPF 37 to a temperature higher than the predetermined temperature in cooperation with the first temperature-increase unit 12. The first temperature-increase unit 12 includes at least one of a throttle valve control unit 12a for controlling the opening degree of the throttle valve 11, an early post injection control unit 12b for controlling the fuel injection amount of early post injection, and a common-rail pressure control unit 12c for controlling a common-rail pressure at which fuel is injected. The second temperature-increase unit 14 includes a late post injection control unit 14 for controlling the fuel injection amount of late post injection, which is to inject fuel after the early post injection. Further, instead of or in addition to the late post injection control unit 14, the second temperature-increase unit 14 may comprise an exhaust-duct injection control unit 14 for controlling the fuel injection amount injected into the exhaust channel 21 from an exhaust-duct injection valve 24 disposed between the turbine 3 of the exhaust turbocharger 7 and the downstream side of the branching position of the EGR duct 23.

Figure 3:
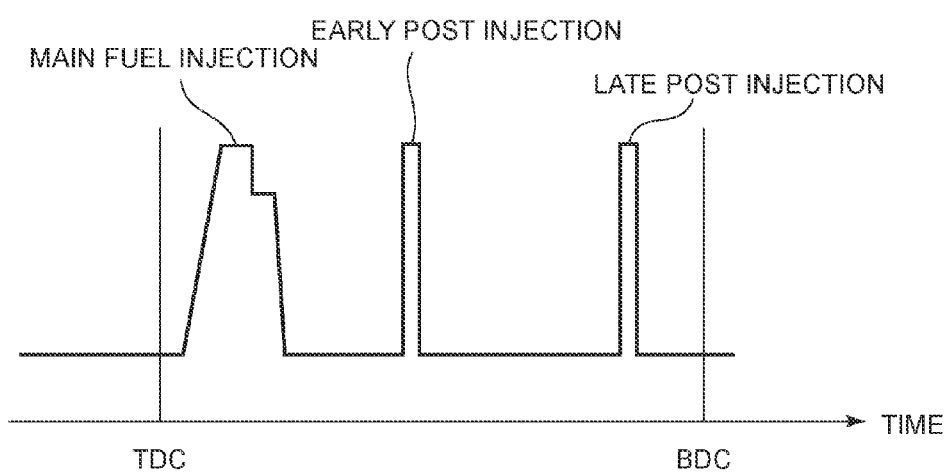
FIG. 3 is an explanatory diagram for describing late post injection of a DPF regeneration control device.

FIG. 3 is an explanatory diagram for describing late post injection of a DPF regeneration control device. Early post injection is the first-time post injection of injecting a smaller amount of fuel than main injection while the pressure in the combustion chamber 39 is still high immediately after injection of the main fuel. The early post injection makes it possible to increase the exhaust-gas temperature without affecting the output of the diesel engine 1. The DOC 35 can be activated by the heated exhaust gas flowing into the DOC 35.

The late post injection is the second-time post injection of injecting fuel at a timing (in the vicinity of the bottom dead center) that does not contribute to combustion inside the combustion chamber 39 after the above described early post injection. The late post injection causes non-combusted fuel to flow out from the combustion chamber 39 into the exhaust channel 21, and the discharged non-combusted fuel is oxidized by the DOC 35 to increase the temperature of the DPF 37, thereby combusting the PM accumulated on the DPF 37.

The automatic regeneration execution unit 10B is configured to execute the automatic regeneration with the above described DPF temperature-increase unit 10A automatically, if the forced regeneration execution conditions for the automatic regeneration are met. The forced regeneration execution conditions for the automatic regeneration may include, for instance: an estimate value of the PM accumulation amount on the DPF 37 exceeds a predetermined value; the operation time of the diesel engine 1 exceeds a predetermined period; or the cumulative of the fuel injection amount of the diesel engine 1 exceeds a predetermined amount. The PM accumulation amount on the DPF 37 can be estimated by detecting a differential pressure between the upstream and downstream sides of the DPF 37 with the DPF differential-pressure sensor 56, for instance. Further, the PM accumulation amount can be also estimated by detecting the engine rotation speed, the fuel injection amount, the air flow rate, and the DPF temperature, estimating a PM regeneration amount inside the DPF and a PM discharge amount from the diesel engine 1 on the basis of a map stored in advance in the ECU 10, and subtracting the PM regeneration amount from the PM discharge amount.

The DOC clogging countermeasure unit 10C is configured to stop the above automatic regeneration and to issue an alert to prompt an operator or the like of the diesel engine 1 to execute the manual regeneration, if clogging of the DOC 35 is detected. The DOC clogging detection unit 10D detects clogging of the DOC 35. The DOC clogging detection unit 10D detects that the DOC 35 is clogged if a clogging parameter related to clogging of the DOC 35 described below detected during execution of the automatic regeneration is greater than a clogging threshold value determined in advance.

The DOC clogging initial stage countermeasure unit 10E is configured to continue operation of only the first temperature-increase unit 12 without stopping operation of the second temperature-increase unit 14 after completion of the automatic regeneration, if no clogging of the DOC 35 is detected but the DOC 35 is detected to be in the initial stage of clogging. The initial stage of clogging of the DOC 35 is detected by the DOC clogging initial stage detection unit 10F. The DOC clogging initial stage detection unit 10F detects that the DOC 35 is in the initial stage of clogging if a clogging parameter, which will be described below, detected during execution of the automatic regeneration is not greater than a clogging threshold value set in advance and is greater than the second clogging threshold value smaller than the clogging threshold value, or, if the clogging parameter described below is not greater than the clogging threshold value set in advance and a change amount of the clogging parameter is greater than a change-amount threshold value set in advance.

For instance, the DOC clogging detection unit 10D detects clogging of the DOC 35 if a relationship of $\Delta Tp > 70°$ C. is satisfied, where the clogging parameter is a DPF inlet-outlet temperature difference $\Delta Tp$, the clogging threshold value is 70° C., the second clogging threshold value is 30° C., and the change-amount threshold value is 10° C. Also, the DOC clogging initial stage detection unit 10F detects that the DOC 35 is in the initial stage of clogging if a relationship of $70° C. > \Delta Tp > 30° C.$ is satisfied. Also, the DOC clogging initial stage detection unit 10F detects that the DOC 35 is in the initial stage of clogging if a relationship of 70° C.>ΔTp and a relationship of dΔTp/dt>10° C. are satisfied.

Figure 4:
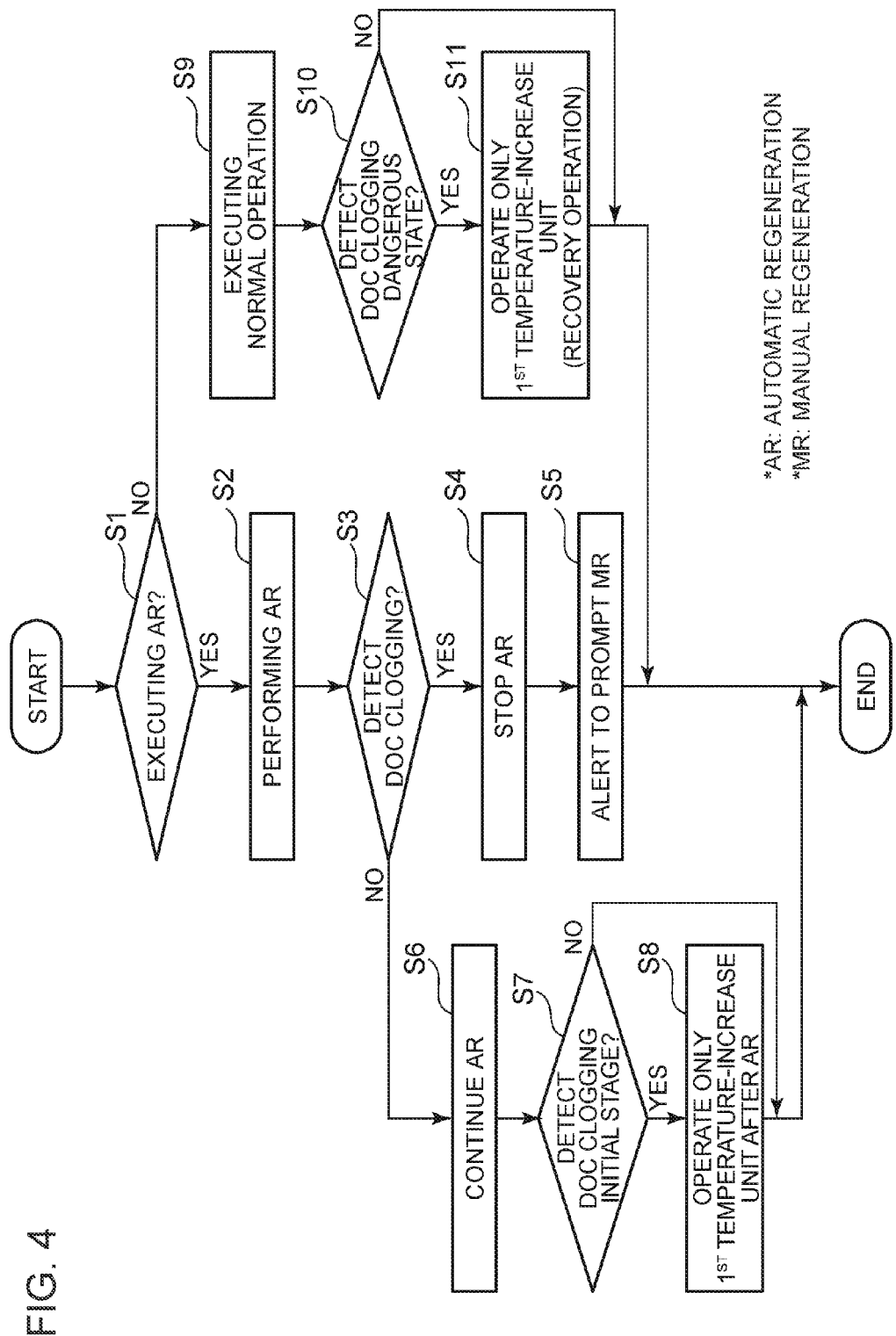
FIG. 4 is a flowchart of a control flow of the DPF regeneration control device.

FIG. 4 is a flowchart of a control flow of the DPF regeneration control device.

In the drawings, it is firstly determined whether the automatic regeneration is being executed (step 1). If the automatic regeneration is being executed (step 2), the DOC clogging detection unit 10D detects whether the DOC 35 is clogging (step 3). In contrast, if the automatic regeneration is not being executed, it is determined that the normal operation is being performed (step 9), and the process advances to step 10 described below.

If clogging of the DOC 35 is detected in step S3, the DOC clogging countermeasure unit 10C suspends the automatic regeneration (step S4), and issues an alert to an operator or the like of the diesel engine 1 to prompt execution of the manual regeneration (step 5).

If clogging of the DOC 35 is not detected in step 3, the automatic regeneration is continued (step S6). Then, the DOC clogging initial stage detection unit 10F detects whether the DOC 35 is in the clogging initial stage (step S7). If it is detected that the DOC 35 is in the clogging initial stage, the DOC clogging initial stage countermeasure unit 10E continues to operate only the first temperature-increase unit 12 for a predetermined period after completion of the automatic regeneration (step 8). In contrast, if it is detected that the DOC 35 is not in the clogging initial stage, operation of the first temperature-increase unit 12 is ended after completion of the automatic regeneration.

Figure 5A:
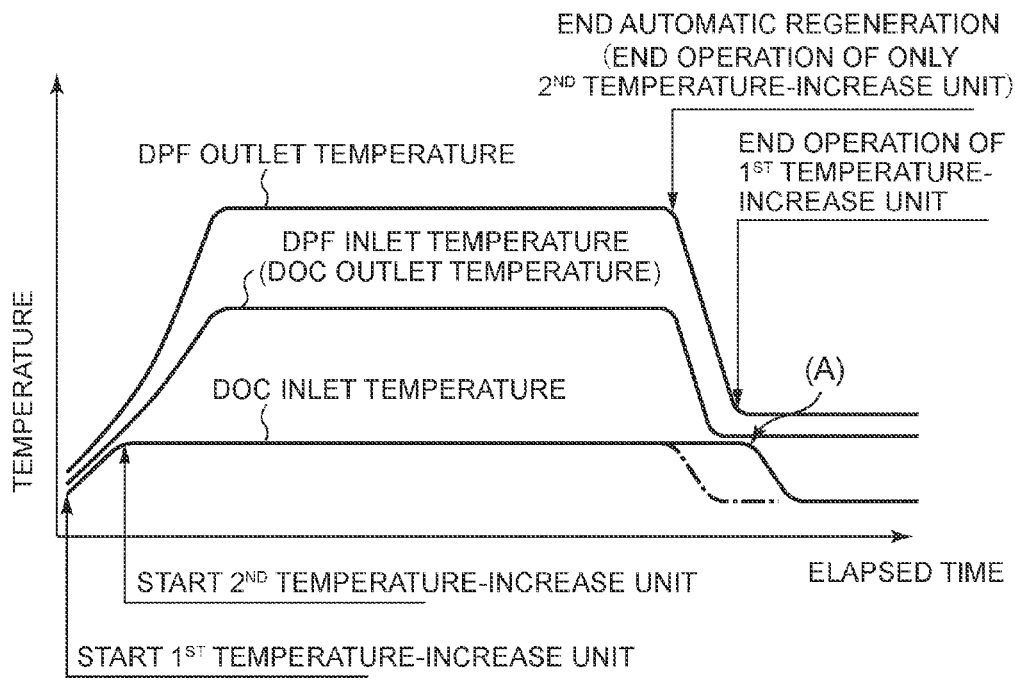
FIG. 5 is a graph showing temperature changes of DPF inlet and outlet temperatures and DOC inlet and outlet temperatures during automatic regeneration.
Figure 5B:
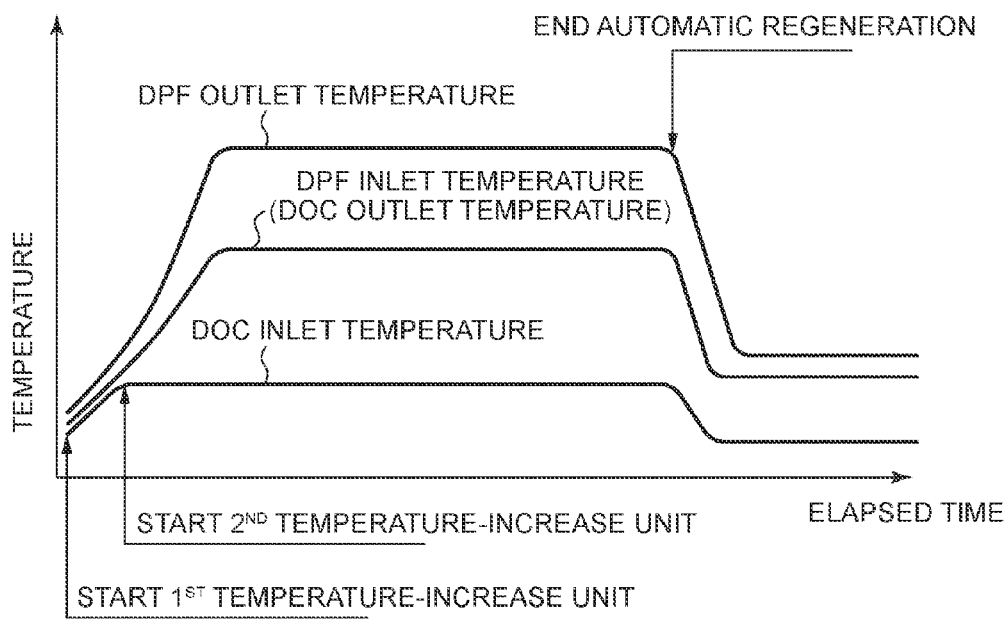

FIG. 5 is a graph showing temperature changes of DPF inlet and outlet temperatures and DOC inlet and outlet temperatures during automatic regeneration. FIG. 5A is a temperature graph of a case where only the first temperature-increase unit 12 is operated continuously for a predetermined period after completion of the automatic regeneration, and FIG. 5B is a temperature graph of a case where operation is ended for both of the first temperature-increase unit 12 and the second temperature-increase unit 14 simultaneously with completion of the automatic regeneration.

As indicated by the reference sign (A) in FIG. 5A, after completion of the automatic regeneration, if only the first temperature-increase unit 12 is operated for a predetermined period, the DOC inlet temperature is maintained to be high for a predetermined period also after completion of the automatic regeneration. In this way, it is possible to remove non-combusted fuel adhering to the upstream end surface of the DOC 35 by late post injection (exhaust-duct injection) during the automatic regeneration.

The DPF regeneration control device (ECU) 10 of the diesel engine 1 according to an embodiment of the present invention with the above configuration includes the DOC clogging detection unit 10D for detecting clogging of the DOC 35 during the automatic regeneration. If clogging of the DOC 35 is detected during the automatic regeneration, the automatic regeneration is stopped and an operator or the like of the diesel engine 1 is prompted by an alert to execute the manual regeneration, which is to increase the temperature of the DPF 37 higher than that in the automatic regeneration. Thus, it is possible to recover the DOC 35 from clogging securely even if the DOC 35 is clogged.

Further, the DPF regeneration control device 10 includes the DOC clogging initial stage detection unit 10F for detecting the clogging initial stage of the DOC 35 during the automatic regeneration, as described above. Then, if the clogging initial stage of the DOC 35 is detected during the automatic regeneration, the first temperature-increase unit 12 is operated for a predetermined period after completion of the automatic regeneration. Thus, the temperature of the DOC 35 is increased by the first temperature-increase unit 12 only if the clogging initial stage of the DOC 35 is detected. If the clogging initial stage of the DOC 35 is not detected, the temperature increase of the DOC 35 by the first temperature-increase unit 12 is ended at the same time as completion of the automatic regeneration. In this way, it is possible to prevent clogging of the DOC 35 more efficiently than conventional techniques.

In some embodiments, as illustrated in FIG. 2, the above described DPF regeneration control device 10 further includes a DOC clogging dangerous state countermeasure unit 10G and a DOC clogging dangerous state detection unit 10H.

The DOC clogging dangerous state countermeasure unit 10G is configured to operate only the first temperature-increase unit 12 without operating the second temperature-increase unit 14, if it is detected that the DOC 35 is under a clogging dangerous state. Whether the DOC 35 is in the clogging dangerous state is detected by the DOC clogging dangerous state detection unit 10H. The DOC clogging dangerous state detection unit 10H detects that the DOC 35 is in the clogging dangerous state if the diesel engine 1 is under an operation condition which is likely to cause clogging of the DOC 35 during normal operation, in which none of forced regenerations, the automatic regeneration or the manual regeneration, is executed. Specifically, it is detected that the DOC 35 is in the clogging dangerous state if one or more of the following conditions are met: the temperature of the exhaust gas is continuously not greater than a predetermined temperature for a predetermined period or longer; the number of times per unit time that the change rate of the engine rotation speed of the diesel engine 1 exceeds a preset rotation-speed threshold value continuously exceeds a threshold value for a predetermined period or longer; or a mean value of a PM discharge-amount estimate value is continuously at least a preset threshold value for a predetermined period or longer.

For instance, the clogging dangerous state of the DOC 35 is detected if the exhaust gas temperature is continuously not greater than 250° C. for at least three hours, if the change rate of the engine rotation speed exceeds a rotation-speed threshold value of 500 rpm/sec more times per unit time than the threshold value of 200 times per hour continuously for at least three hours, or if the time mean value of the PM discharge amount estimate value calculated by the ECU 10 is continuously at least a threshold value of 1.5 g/h for at least three hours.

As illustrated in FIG. 4, in step S1, if it is determined that the automatic regeneration is not performed, it is determined that the normal operation is being performed (step 9), and the process advances to step 10. Then, the DOC clogging dangerous state detection unit 10H detects whether the DOC 35 is in the clogging dangerous state (step S10). If it is detected that the DOC 35 is in the clogging dangerous state, recovery operation is performed in which the DOC clogging dangerous state countermeasure unit 10G continues to operate only the first temperature-increase unit 12 for a predetermined period (step 11). In this way, the exhaust gas temperature is increased by the first temperature-increase unit 12 for a predetermined period, which makes it possible to remove soot or the like adhering to the upstream end surface of the DOC 35 under an operation condition which is likely to bring about clogging of the DOC 35. In contrast, if it is detected that the DOC 35 is not in the clogging dangerous state, the above recovery operation is not performed.

According to the above embodiment, the clogging dangerous state of the DOC 35 is detected from the operation state of the diesel engine 1, and if it is detected that the DOC 35 is in the clogging dangerous state, the first temperature-increase unit 12 increases the temperature of the DOC 35. Thus, it is possible to prevent clogging of the DOC 35 in advance during normal operation.

Figure 6:
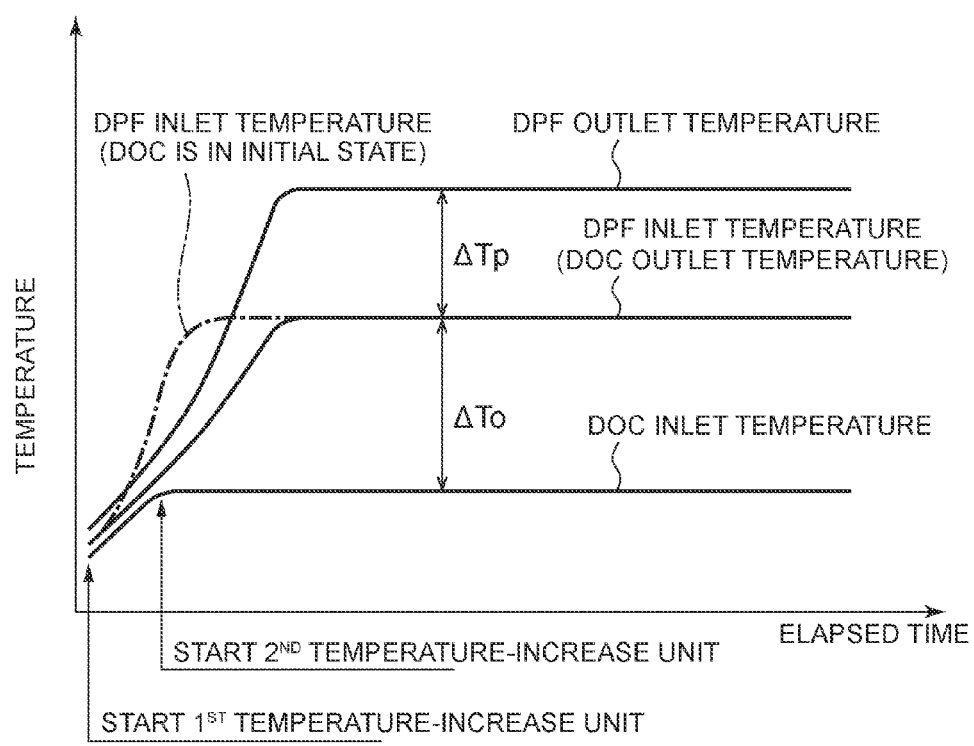
FIG. 6 is a graph showing temperature changes of DPF inlet and outlet temperatures and DOC inlet and outlet temperatures during an initial stage of the automatic regeneration.

FIG. 6 is a graph showing temperature changes of DPF inlet and outlet temperatures and DOC inlet and outlet temperatures during an initial stage of the automatic regeneration.

In some embodiments, the above clogging parameter is set on the basis of the inlet temperature of the DPF 37 and the outlet temperature of the DPF 37.

Specifically, if clogging of the DOC 35 progresses, fuel is not sufficiently oxidized by the DOC 35, and the DPF inlet temperature does not sufficiently increase. Further, the non-combusted fuel having slipped the DOC 35 is combusted by the DPF 37 at the downstream side, and thus the DPF outlet temperature increases excessively. Thus, if clogging of the DOC 35 progresses, in the temperature graph illustrated in FIG. 6, the temperature difference ($\Delta Tp$) between the DPF outlet temperature and the DPF inlet temperature increases.

Thus, the clogging parameter Pr1 can be set by the following equation (1) as a temperature difference between Tp1 and Tp2, where Tp1 is the inlet temperature of the DPF 37 and Tp2 is the outlet temperature of the DPF 37. In this case, the clogging parameter Pr1 increases with progress of clogging of the DOC 35.

$$Pr1=(Tp2-Tp1) \quad (1)$$

According to the above embodiment, clogging of the DOC 35 and the clogging initial stage of the DOC 35 can be detected by detecting the inlet temperature of the DPF 37 and the outlet temperature of the DPF 37.

In some embodiments, the above clogging parameter is set as the outlet temperature of the DPF 37.

Specifically, if clogging of the DOC 35 progresses as described above, non-combusted fuel having slipped the DOC 35 is combusted by the DPF 37 at the downstream side, and thus the DPF outlet temperature increases excessively. Thus, the clogging parameter Pr2 can be set by the following equation (2), where Tp2 is the outlet temperature of the DPF. In this case, the clogging parameter Pr2 increases with progress of clogging of the DOC 35.

$$Pr2=Tp2 \quad (2)$$

According to the above embodiment, clogging of the DOC 35 and the clogging initial stage of the DOC 35 can be detected by detecting the outlet temperature of the DPF 37.

In some embodiments, the clogging parameter is set on the basis of the temperature difference between the outlet temperature and the inlet temperature of the DOC 35, the flow rate of exhaust gas flowing through the DOC 35, and the fuel injection amount of late post injection (or exhaust-duct injection).

Specifically, if clogging of the DOC 35 progresses, fuel injected by late post injection (exhaust-duct injection) is not oxidized sufficiently by the DOC 35, and the calorific value of the DOC 35 with respect to the fuel injection amount decreases. Thus, the clogging parameter Pr3 can be set by the following equation (3), where $\Delta To$ is a temperature difference between the outlet temperature and the inlet temperature of the DOC 35, Qe is the flow rate of exhaust gas flowing through the DOC 35, and Qfe is the fuel injection amount of late post injection (or exhaust-duct injection). In this case, the clogging parameter Pr3 increases with progress of clogging of the DOC 35.

$$Pr3=Qfe/\Delta To \cdot Qe \quad (3)$$

According to the above embodiment, clogging of the DOC 35 and the clogging initial stage of the DOC 35 can be detected by detecting the inlet temperature and the outlet temperature of the DOC 35, and the fuel injection amount of late post injection (or exhaust-duct injection).

In some embodiments, the above clogging parameter is set on the basis of an increasing speed of the inlet temperature of the DPF 37 and an increasing speed of the inlet temperature of the DPF 37 in an initial state in which the DOC 35 is not clogged.

Specifically, if clogging of the DOC 35 progresses, fuel is not sufficiently oxidized by the DOC 35, and the increase speed of the DPF inlet temperature slows down. Thus, the clogging parameter Pr4 can be set by the following equation (4), where Vt is an increase speed of the inlet temperature of the DPF 37 and Vt' is an increase speed of the inlet temperature (single-dotted chain line in FIG. 6) of the DPF 37 in an initial state in which the DOC 35 is not clogged. In this case, the clogging parameter Pr4 increases with progress of clogging of the DOC 35.

$$Pr4=Vt'/Vt \quad (4)$$

According to the above embodiment, clogging of the DOC 35 and the clogging initial stage of the DOC 35 can be detected by having obtained in advance the increase speed of the DPF inlet temperature in the initial state and detecting the increase speed of the DPF inlet temperature.

The increase speed Vt of the DPF inlet temperature and the increase speed Vt' of the inlet temperature of the DPF in the initial state in the above embodiment are detected under the same conditions which affect the increase speed, such as the fuel injection amount and the injection timing.

In some embodiments, the above described late post injection control unit (or exhaust-duct injection control unit) 14 are configured so as to control the fuel injection amount so that the inlet temperature of the DPF 37 reaches the target temperature required to execute forced regeneration. The above described clogging parameter is set on the basis of: the cumulative fuel-injection amount of late post injection (or exhaust-duct injection) of injecting fuel while the inlet temperature of the DPF 37 increases by a predetermined temperature, and the cumulative fuel-injection amount of late post injection (or exhaust-duct injection) of injecting fuel while the DPF inlet temperature increases by a predetermined temperature in an initial state in which the DOC 35 is not clogged; or the mean injection amount of late post injection (or exhaust-duct injection) of injection in a stable state in which the inlet temperature of the DPF 37 has reached a target control temperature, and the mean injection amount of late post injection (or exhaust-duct injection) of injection in a stable state in which the inlet temperature of the DPF 37 has reached a target control temperature in an initial state in which the DOC 35 is not clogged.

Specifically, the late post injection control unit (or exhaust-duct injection control unit) 14 are configured to control the fuel injection amount so that the inlet temperature of the DPF 37 reaches a target temperature required to execute forced regeneration. Thus, if clogging of the DOC 35 progresses and the fuel is not sufficiently oxidized by the DOC 35 with an insufficient increase of the DPF inlet temperature, the late post injection control unit (or exhaust-duct injection control unit) 14 performs a control to increase the late post injection amount (or exhaust-duct injection amount). Accordingly, the clogging parameter Pr5 can be set by, for instance, the following equation (5), where ΣQfl is the cumulative fuel-injection amount of late post injection (exhaust-duct injection) of injecting fuel while the inlet temperature of the DPF 37 increases by a predetermined temperature, and ΣQfl' is the cumulative fuel-injection amount of late post injection (or exhaust-duct injection) of injecting fuel while the DPF inlet temperature increases by a predetermined temperature in an initial state in which the DOC 35 is not clogged. In this case, the clogging parameter Pr5 increases with progress of clogging of the DOC 35.

$$Pr5 = \Sigma Qfl / \Sigma Qfl' \quad (5)$$

Alternatively, the clogging parameter Pr5' can be set by, for instance, the following equation (5)', where Qgl is the mean fuel-injection amount of late post injection (exhaust-duct injection) of injection in a stable state in which the inlet temperature of the DPF 37 has reached a target control temperature, and Qgl' is the mean fuel-injection amount of late post injection (or exhaust-duct injection) of injection in a state in which the inlet temperature of the DPF 37 has reached a target control temperature in an initial state in which the DOC 35 is not clogged. In this case, the clogging parameter Pr5' increases with progress of clogging of the DOC 35.

$$Pr5' = Qgl / Qgl' \quad (5)'$$

According to the above embodiment, clogging of the DOC 35 and the clogging initial stage of the DOC 35 can be detected by having obtained in advance the cumulative fuel-injection amount of late post injection (or exhaust-duct injection) of injecting fuel while the DPF inlet temperature increases by a predetermined temperature in the initial state, and detecting the cumulative amount of late post injection (or exhaust-duct injection) of injecting fuel while the DPF inlet temperature increases by a predetermined temperature.

Further, in the above embodiment, the above described ΣQfl, ΣQfl', Qgl, and Qgl' are detected under the same conditions which affect the cumulative amount of late post injection or exhaust-duct injection, such as the fuel-injection timing and the increase speed of the DPF inlet temperature.

In some embodiments, the above described clogging threshold value and the second clogging threshold value are set so as to increase with thermal deterioration of the DOC 35.

If thermal deterioration progresses in the DOC 35, the oxidization performance deteriorates, thus affecting the value of the clogging parameter to become larger. Thus, according to the above embodiment, clogging of the DOC 35 and the clogging initial stage of the DOC 35 can be detected accurately regardless of the thermal deterioration of the DOC 35 by setting the clogging threshold value taking account of the influence of the thermal deterioration of the DOC 35.

The embodiments of the present invention have been described above. However, the present invention is not limited thereto. For instance, various modifications may be applied as long as they do not depart from the object of the present invention.

INDUSTRIAL APPLICABILITY

At least one embodiment of the present invention can be suitably used as a DPF regeneration control device for an exhaust-gas processing device of a diesel engine, in an engine not only for automobiles but also for ships and the industrial use.

DESCRIPTION OF REFERENCE NUMERALS

1 Diesel engine
3 Exhaust turbine
5 Compressor
7 Exhaust turbocharger
9 Intake channel
10 ECU (DPF regeneration control device)
10A DPF temperature-increase unit
10B Automatic regeneration execution unit
10C DOC clogging countermeasure unit
10D DOC clogging detection unit
10E DOC clogging initial stage countermeasure unit
10F DOC clogging initial stage detection unit
10G DOC clogging dangerous state countermeasure unit
10H DOC clogging dangerous state detection unit
11 Throttle valve
12 First temperature-increase unit
12a Throttle valve control unit
12b Early post injection control unit
12c Common-rail pressure control unit
13 Intake manifold
14 Second temperature-increase unit (late post injection control unit or exhaust-duct injection control unit)
15 Intake port
19 Fuel injection valve
21 Exhaust channel
23 EGR duct
24 Exhaust-duct injection valve
25 EGR valve
29 Exhaust port
33 Exhaust-gas processing device
35 DOC (diesel oxidization catalyst)
37 DPF (diesel particulate filter)
39 Combustion chamber
48 DOC inlet temperature sensor
49 DPF inlet temperature sensor
50 DPF outlet temperature sensor
52 DPF inlet pressure sensor
54 DPF outlet pressure sensor
56 DPF differential-pressure sensor

The invention claimed is:

1. A diesel particulate filter (DPF) regeneration control device, provided for an exhaust-gas processing device of a diesel engine, the exhaust-gas processing device including a diesel oxidation catalyst (DOC) disposed in an exhaust channel and a DPF disposed on a downstream side of the DOC, for controlling execution of forced regeneration of heating the DPF to remove particulate matter (PM) which accumulates on the DPF, the forced regeneration comprising automatic regeneration automatically executed if a predetermined forced-regeneration execution condition is satisfied, and manual regeneration executed by manual operation to heat the DPF to a higher temperature than in the automatic regeneration, and the DPF regeneration device comprising:
a central processor to:
control a DPF temperature increase to include a first temperature increase to heat the DPF to a predetermined temperature, and a second temperature increase to heat the DPF to a temperature higher than the predetermined temperature in cooperation with the first temperature increase;

detect DOC clogging if a clogging parameter detected during execution of the automatic regeneration exceeds a clogging threshold value determined in advance for a predetermined period, the clogging parameter being related to clogging of the DOC;

stop the automatic regeneration via DOC clogging countermeasures and issue an alert to prompt execution of the manual regeneration, if the clogging of the DOC is detected;

detect that the DOC is in an initial stage of clogging if the clogging parameter detected during the automatic regeneration is not greater than the clogging threshold value and greater than a second clogging threshold value smaller than the clogging threshold value for a predetermined period, or if the clogging parameter is not greater than the clogging threshold value and a change amount of the clogging parameter is greater than a change-amount threshold value set in advance for a predetermined period; and execute DOC clogging initial stage countermeasures to control the first temperature increase for a predetermined period after completion of the automatic regeneration if the DOC is detected to be in the initial stage of the clogging.

2. The DPF regeneration control device according to claim 1, wherein control of the first temperature increase comprises at least one of:

control of a throttle valve to control an opening degree of a throttle valve disposed in an intake channel, control of early post injection control to control a fuel injection amount of early post injection of injecting fuel after a time of main combustion injection, or control of rail-pressure to control a rail pressure at which the fuel is injected, and wherein control of the second temperature increase comprises:

control of late post injection to control a fuel injection amount of late post injection of injecting fuel at a timing which does not contribute to combustion in a combustion chamber after the early post injection, or control of exhaust-duct injection to control a fuel injection amount of exhaust-duct injection of injecting fuel to an exhaust channel on an engine downstream side.

3. The DPF regeneration control device according to claim 2, wherein the clogging parameter is to be set on the basis of a temperature difference between an outlet temperature and an inlet temperature of the DOC, a flow rate of exhaust gas flowing through the DOC, and a fuel-injection amount of the late post injection or the exhaust-duct injection.

4. The DPF regeneration control device according to claim 2, wherein control of the late post injection or control of the exhaust-duct injection is to control a fuel injection amount so that an inlet temperature of the DPF is to reach a target temperature required to execute the forced regeneration, and wherein the clogging parameter is to be set
on the basis of a cumulative fuel-injection amount of the late post injection or the exhaust-duct injection while an inlet temperature of the DPF is to increase by a predetermined temperature, and a cumulative fuel-injection amount of the late post injection or the exhaust-duct injection while the inlet temperature of the DPF increases by the predetermined temperature in an initial state in which the DOC is not clogged, or on the basis of a mean injection amount of the late post injection or the exhaust-duct injection in a stable state in which the inlet temperature of the DPF is to have reached a target control temperature, and a mean injection amount of the late post injection or the exhaust-duct injection of injecting in a stable state in which the inlet temperature of the DPF is to have reached a target control temperature in an initial state in which the DOC is not clogged.

5. The DPF regeneration control device according to claim 2, wherein control of the late post injection or control of the exhaust-duct injection is to control a fuel injection amount so that an inlet temperature of the DPF is to reach a target temperature required to execute the forced regeneration, and wherein the clogging parameter is to comprise at least two of:

a clogging parameter to be set on the basis of a temperature difference between an inlet temperature of the DPF and an outlet temperature of the DPF;

a clogging parameter to be set as an outlet temperature of the DPF;

a clogging parameter to be set on the basis of a temperature difference between an outlet temperature and an inlet temperature of the DOC, a flow rate of exhaust gas flowing through the DOC, and a fuel-injection amount of the late post injection or the exhaust-duct injection;

the clogging parameter to be set on the basis of an increase speed of the inlet temperature of the DPF, and an increase speed of the inlet temperature of the DPF in an initial state in which the DOC is not clogged; and a clogging parameter to be set on the basis of a cumulative fuel-injection amount of the late post injection or the exhaust-duct injection of injecting while an inlet temperature of the DPF is to increase by a predetermined temperature, and a cumulative fuel-injection amount of the late post injection or the exhaust-duct injection of injecting while the inlet temperature of the DPF is to increase by the predetermined temperature in an initial state in which the DOC is not clogged, or on the basis of a mean injection amount of the late post injection or the exhaust-duct injection in a stable state in which the inlet temperature of the DPF is to have reached a target control temperature, and a mean injection amount of the late post injection or the exhaust-duct injection of injecting in a stable state in which the inlet temperature of the DPF is to have reached a target control temperature in an initial state in which the DOC is not clogged.

6. The DPF regeneration control device according to claim 1, wherein the clogging parameter is to be set on the basis of a temperature difference between an inlet temperature of the DPF and an outlet temperature of the DPF.

7. The DPF regeneration control device according to claim 1, wherein the clogging parameter is to be set as an outlet temperature of the DPF.

8. The DPF regeneration control device according to claim 1, wherein the clogging parameter is to be set on the basis of an increased speed of an inlet temperature of the DPF, and an increase speed of the inlet temperature of the DPF in an initial state in which the DOC is not clogged.

9. A diesel particulate filter (DPF) regeneration control device, provided for an exhaust-gas processing device of a diesel engine, the exhaust-gas processing device including a diesel oxidation catalyst (DOC) disposed in an exhaust channel and a DPF disposed on a downstream side of the DOC, for controlling execution of forced regeneration of heating the DPF to remove particulate matters (PM) which accumulates on the DPF, the forced regeneration comprising automatic regeneration automatically executed if a predetermined forced-regeneration execution condition is satisfied, and manual regeneration executed by manual operation to heat the DPF to a higher temperature than in the automatic regeneration, and the DPF regeneration device comprising:

a central processor to:
control a DPF temperature, to include a first temperature increase to heat the DPF to a predetermined temperature, and a second temperature increase to heat the DPF to a temperature higher than the predetermined temperature in cooperation with the first temperature increase;
detect DOC clogging if a clogging parameter detected during execution of the automatic regeneration exceeds a clogging threshold value determined in advance for a predetermined period, the clogging parameter being related to clogging of the DOC;
stop the automatic regeneration via DOC clogging countermeasures and issue an alert to prompt execution of the manual regeneration, if the clogging of the DOC is detected;
detect a DOC clogging dangerous state if the diesel engine is under an operation state in which clogging of the DOC is likely to occur during normal operation in which none of the forced regenerations, which are the automatic regeneration and the manual regeneration, is executed; and
execute DOC clogging dangerous state countermeasures to control the first temperature increase for only a predetermined period if the DOC is detected to be in the clogging dangerous state.

10. The DPF regeneration control device according to claim 9, wherein control of the first temperature increase comprises at least one of control of a throttle valve to control an opening degree of a throttle valve disposed in an intake channel,
control of an early post injection to control a fuel injection amount of early post injection of injecting fuel after a time of main combustion injection, or
control of a rail-pressure to control a rail pressure at which the fuel is injected, and
wherein control of the second temperature increase comprises
control of late post injection to control a fuel injection amount of late post injection of fuel at a timing which is not to contribute to combustion in a combustion chamber after the early post injection, or
control of exhaust-duct injection to control a fuel injection amount of exhaust-duct injection of injecting fuel to an exhaust channel on an engine downstream side.

11. The DPF regeneration control device according to claim 10,
wherein the clogging parameter is to set on the basis of a temperature difference between an outlet temperature and an inlet temperature of the DOC, a flow rate of exhaust gas flowing through the DOC, and a fuel-injection amount of the late post injection or the exhaust-duct injection.

12. The DPF regeneration control device according to claim 10, wherein control of the late post injection or control of the exhaust-duct injection is to control a fuel injection amount so that an inlet temperature of the DPF is to reach a target temperature required to execute the forced regeneration, and wherein the clogging parameter is to be set on the basis of a cumulative fuel-injection amount of the late post injection or the exhaust-duct injection of injecting while an inlet temperature of the DPF is to increase by a predetermined temperature, and a cumulative fuel-injection amount of the late post injection or the exhaust-duct injection of injecting while the inlet temperature of the DPF is to increase by the predetermined temperature in an initial state in which the DOC is not clogged, or on the basis of a mean injection amount of the late post injection or the exhaust-duct injection of injecting in a stable state in which the inlet temperature of the DPF is too have reached a target control temperature, and a mean injection amount of the late post injection or the exhaust-duct injection of injecting in a stable state in which the inlet temperature of the DPF is to have reached a target control temperature in an initial state in which the DOC is not clogged.

13. The DPF regeneration control device according to claim 10,
wherein control of the late post injection or control of the exhaust-duct injection is to control a fuel injection amount so that an inlet temperature of the DPF reaches a target temperature required to execute the forced regeneration, and
wherein the clogging parameter is to comprise at least two of:
a clogging parameter to be set on the basis of a temperature difference between an inlet temperature of the DPF and an outlet temperature of the DPF;
a clogging parameter to be set as an outlet temperature of the DPF;
a clogging parameter to be set on the basis of a temperature difference between an outlet temperature and an inlet temperature of the DOC, a flow rate of exhaust gas flowing through the DOC, and a fuel-injection amount of the late post injection or the exhaust-duct injection;
the clogging parameter to be set on the basis of an increase speed of the inlet temperature of the DPF, and an increase speed of the inlet temperature of the DPF in an initial state in which the DOC is not clogged; and
a clogging parameter to be set on the basis of a cumulative fuel-injection amount of the late post injection or the exhaust-duct injection of injecting while an inlet temperature of the DPF is to be increased by a predetermined temperature, and a cumulative fuel-injection amount of the late post injection or the exhaust-duct injection of injecting while the inlet temperature of the DPF is to be increased by the predetermined temperature in an initial state in which the DOC is not clogged, or on the basis of a mean injection amount of the late post injection or the exhaust-duct injection of injecting in a stable state in which the inlet temperature of the DPF has reached a target control temperature, and a mean injection amount of the late post injection or the exhaust-duct injection of injecting in a stable state in which the inlet temperature of the DPF is to have reached a target control temperature in an initial state in which the DOC is not clogged.

14. The DPF regeneration control device according to claim 9,
wherein the DOC clogging dangerous state detection is to detect that the DOC is in the clogging dangerous state, if one or more of following conditions are satisfied:
a temperature of exhaust gas is not greater than a predetermined temperature continuously for a predetermined period or longer;
the number of times, per unit time, which a change rate of an engine rotation speed of the diesel engine exceeds a predetermined rotation-speed threshold value exceeds a threshold value continuously for a predetermined period or longer; and
a mean value of a PM discharge-amount estimate value is at least a predetermined threshold value continuously for a predetermined period or longer.

15. The DPF regeneration control device according to claim 9,
wherein the clogging parameter is to be set on the basis of a temperature difference between an inlet temperature of the DPF and an outlet temperature of the DPF.

16. The DPF regeneration, control device according to claim 9,
wherein the clogging parameter is to be set as an outlet temperature of the DPF.

17. The DPF regeneration control device according to claim 9, wherein
the clogging parameter is to be set on the basis of an increase speed of an inlet temperature of the DPF, and an increase speed of the inlet temperature of the DPF in an initial state in which the DOC is not clogged.

18. A diesel particulate filter (DPF) regeneration control method, applied to an exhaust-gas processing device of a diesel engine, the exhaust-gas processing device including a diesel oxidation catalyst (DOC) disposed in an exhaust channel and a DPF disposed on a downstream side of the DOC, for controlling execution of forced regeneration of heating the DPF to remove particulate matters (PM) which accumulates on the DPF, the forced regeneration comprising automatic regeneration automatically executed if a predetermined forced-regeneration execution condition is satisfied, and manual regeneration executed by manual operation to heat the DPF to a higher temperature than in the automatic regeneration, and the DPF regeneration method comprising:
increasing temperature of a DPF, including a first temperature increase to heat the DPF to a predetermined temperature, including a second temperature increase to heat the DPF to a temperature higher than the predetermined temperature in cooperation with the first temperature increase;
detecting clogging in a DOC, wherein the DOC is clogged if a clogging parameter detected during execution of the automatic regeneration exceeds a clogging threshold value determined in advance for a predetermined period, the clogging parameter being related to clogging of the DOC;
executing DOC clogging countermeasures to stop the automatic regeneration and issue an alert to prompt execution of the manual regeneration, if the clogging of the DOC is detected;
detecting DOC clogging at an initial stage to detect that the DOC is in an initial stage of clogging if the clogging parameter detected during execution of the automatic regeneration is not greater than the clogging threshold value, and greater than a second clogging threshold value smaller than the clogging threshold value for a predetermined period, or if the clogging parameter is not greater than the clogging threshold value and a change amount of the clogging parameter is greater than a change-amount threshold value to be set in advance for a predetermined period; and
executing DOC clogging initial stage countermeasures to operate the first temperature increase for a predetermined period after completion of the automatic regeneration if the DOC is detected to be in the initial stage of the clogging.

19. A diesel particulate filter (DPF) regeneration control method, applied to an exhaust-gas processing device of a diesel engine, the exhaust-gas processing device including a diesel oxidation catalyst (DOC) disposed in an exhaust channel and a DPF disposed on a downstream side of the DOC, for controlling execution of forced regeneration of heating the DPF to remove particulate matters (PM) which accumulates on the DPF, the forced regeneration comprising automatic regeneration automatically executed if a predetermined forced-regeneration execution condition is satisfied, and manual regeneration executed by manual operation to heat the DPF to a higher temperature than in the automatic regeneration, and the DPF regeneration method comprising:
increasing a DPF temperature, including a first temperature increase to heat the DPF to a predetermined temperature, and including a second temperature increase to heat the DPF to a temperature higher than the predetermined temperature in cooperation with the first temperature increase;
detecting a DOC clog if a clogging parameter detected during execution of the automatic regeneration exceeds a clogging threshold value determined in advance for a predetermined period, the clogging parameter being related to clogging of the DOC;
executing DOC clogging countermeasures to stop the automatic regeneration and to issue an alert to prompt execution of the manual regeneration, if the clogging of the DOC is detected;
detecting a DOC clogging dangerous state if the diesel engine is under an operation state in which clogging of the DOC is likely to occur during normal operation in which none of the forced regenerations, which are the automatic regeneration and the manual regeneration, is executed; and
executing DOC clogging countermeasures to include a first temperature increase for only a predetermined period if the DOC is detected to be in the clogging dangerous state.

* * * * *